United States Patent
Morrison et al.

(10) Patent No.: US 10,100,642 B2
(45) Date of Patent: Oct. 16, 2018

(54) LOW DIAMETER TURBINE ROTOR CLAMPING ARRANGEMENT

(71) Applicant: Rolls-Royce Corporation, Indianapolis, IN (US)

(72) Inventors: Daniel K. Morrison, Westfield, IN (US); Matthew P. Basiletti, Lafayette, IN (US); Matthew I Jackson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 399 days.

(21) Appl. No.: 14/841,308

(22) Filed: Aug. 31, 2015

(65) Prior Publication Data
US 2017/0058675 A1 Mar. 2, 2017

(51) Int. Cl.
*F01D 5/06* (2006.01)
*F01D 5/02* (2006.01)

(52) U.S. Cl.
CPC .............. *F01D 5/066* (2013.01); *F01D 5/025* (2013.01); *Y02T 50/672* (2013.01)

(58) Field of Classification Search
CPC ...... F01D 5/066; F01D 5/025; F04D 29/0405; F04D 29/044; F04D 29/054
See application file for complete search history.

(56) References Cited

U.S. PATENT DOCUMENTS

| | | | |
|---|---|---|---|
| 3,631,688 A * | 1/1972 | Quick | F01D 5/026 403/316 |
| 4,123,199 A | 10/1978 | Shimizu et al. | |
| 4,737,076 A * | 4/1988 | Bonner | F01D 5/025 403/273 |
| 5,020,932 A * | 6/1991 | Boyd | F01D 5/025 403/289 |
| 5,628,621 A | 5/1997 | Toborg | |
| 5,632,600 A | 5/1997 | Hull | |
| 6,261,063 B1 | 7/2001 | Chikami et al. | |
| 6,672,966 B2 | 1/2004 | Muju et al. | |
| 8,215,919 B2 | 7/2012 | Jewess et al. | |
| 8,465,373 B2 | 6/2013 | Dornfeld et al. | |
| 8,579,538 B2 * | 11/2013 | Juh | F01D 5/066 403/359.5 |
| 2014/0193266 A1 | 7/2014 | Krishnamurthy et al. | |

FOREIGN PATENT DOCUMENTS

GB 1316452 A * 5/1973 ............. F01D 5/026

* cited by examiner

*Primary Examiner* — David E Sosnowski
*Assistant Examiner* — Juan G Flores
(74) *Attorney, Agent, or Firm* — Barnes & Thornburg LLP

(57) ABSTRACT

A gas turbine engine having turbine discs includes a low diameter turbine rotor clamp for securing the turbine discs together. The rotor clamp includes a clamp sleeve, a clamp cylinder adapted to be threadably engaged to the clamp sleeve to apply an axial force on the turbine discs being coupled together. The rotor clamp includes an anti-score ring positioned between the bore of a turbine disc and the clamp cylinder and a lock tube used to prevent unwanted rotation of the clamp cylinder with respect to the clamp sleeve.

19 Claims, 4 Drawing Sheets

LOW DIAMETER TURBINE ROTOR CLAMPING ARRANGEMENT

FIELD OF THE DISCLOSURE

The present disclosure relates generally to gas turbine engines, and more specifically to coupling mechanisms used in gas turbine engines.

BACKGROUND

Gas turbine engines are used to power aircraft, watercraft, power generators, pumps, and the like. Gas turbine engines operate by compressing atmospheric air, burning fuel with the compressed air, and then removing work from hot high-pressure air produced by combustion of the fuel in the air. Rows of rotating blades and non-rotating vanes are used to compress the air and then to remove work from the high-pressure air produced by combustion. Each blade and vane has an airfoil that interacts with the gasses as they pass through the engine.

Multistage rotors of devices such as axial flow compressors and turbines include a number of coaxial disks that are interconnected by face splines and tie bolts. The face splines preferably are of a type known as Curvic® couplings which accurately and positively align the disks. In the manufacture of turbomachines of the multistage type, such as centrifugal compressors, axial flow compressors and turbines, there are advantages in employing rotors of the composite structure, wherein the wheels are arranged in stack formation between stub shafts, which are fixed to the ends of a thru-bolt, sometimes referred to as a tie-bolt.

The wheel members in centrifugal gas compressors take the form of impellers. In turbines and axial flow compressors, the wheels consist of bladed disks. The wheel assembly has an axially extending bore passage having clearance with the thru bolt. This form of rotor structure results in the thru-bolt being of substantial length. Such long bolts have inherent problems associated with bolt resonance, and rotor imbalance, caused mainly by deflection or radial displacement of the bolt. The situation is aggravated by the high speed at which the rotor structure operates.

Curvic couplings for use in the assembly of rotating element components were developed to meet the need for permanent coupling mechanisms requiring extreme accuracy, maximum load capacity, and relatively economical rates of production. The Curvic design provides an accurate, light, compact, and self-contained connection in which the Curvic teeth serve as centering and driving devices. The most widely used type of Curvic coupling used in gas turbine engines is the fixed Curvic coupling.

The fixed Curvic coupling can be described as a precision face spline with teeth that possess a high degree of accuracy of tooth spacing, fine surface finish, and precision axial location. The predominant application of fixed Curvic couplings is in the assembly of the elements that comprise a gas turbine engine rotating group, i.e., impellers, turbine wheels, and couplings. Many standard turboprop and turbofan engines are examples of this application, in which the disk-like members of the rotating group are mounted solely on fixed Curvic coupling teeth.

SUMMARY

The present disclosure may comprise one or more of the following features and combinations thereof.

In illustrative embodiments, a low diameter turbine rotor clamp assembly is used to secure a pair of turbine discs, each having a central bore. The rotor clamp assembly includes a clamp cylinder having a cylindrical wall section and a threaded section. The clamp cylinder adapted to be positioned within the bore of a first turbine disc.

In illustrative embodiments, the rotor clamp assembly also includes a clamp sleeve having a cylindrical wall section and a threaded section. The clamp sleeve is adapted to be positioned within the bore of a second turbine disc. The threaded section of the clamp sleeve is adapted to threadably engage the threaded section of the clamp cylinder to apply an axial force to the first and second turbine discs.

In illustrative embodiments, the rotor clamp assembly includes an anti-score ring that positioned between the bore of the second turbine disc and the cylindrical wall section of the clamp cylinder. The rotor clamp assembly also includes a lock tube positioned within the clamp cylinder and includes first and second lock tab that engages a notches formed in the cylindrical wall sections of the clamp cylinder and clamp sleeve to maintain their position.

These and other features of the present disclosure will become more apparent from the following description of the illustrative embodiments.

DETAILED DESCRIPTION OF THE DRAWINGS

Figure 1:
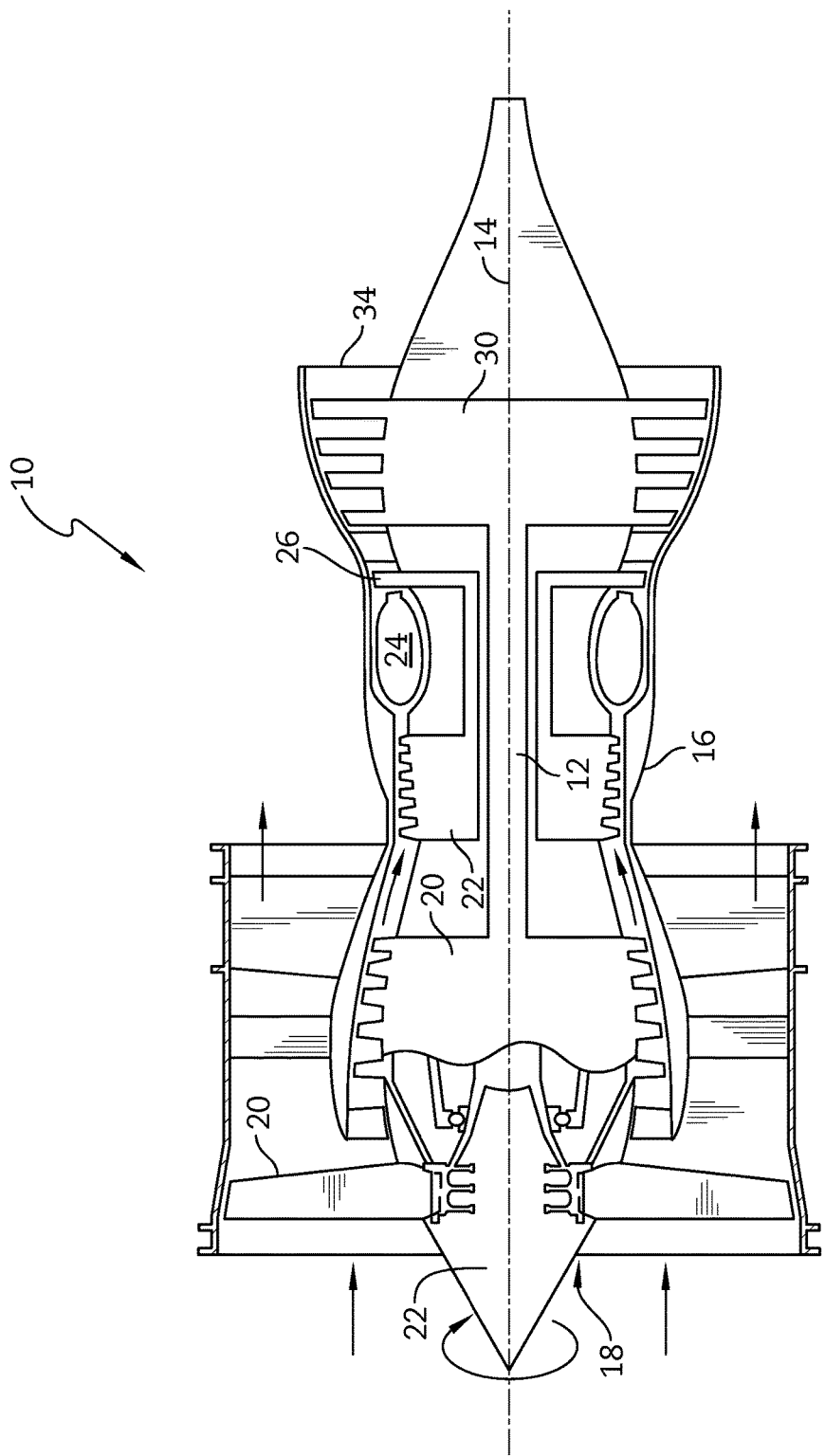
FIG. 1 illustrates a general partial cut-away view of a gas turbine engine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly adapted to accelerate/blow air so that the air provides thrust for moving an aircraft as shown in FIG. 1. The illustrative fan assembly includes a fan rotor or shaft 12 that rotates about a central axis 14 and a fan case 16 mounted to extend around the fan rotor 12.

The fan rotor 12 includes a central fan wheel 18, a plurality of fan blades 20, and a spinner 22 as shown, for example, in FIG. 1. The central fan wheel 18 is arranged around the axis 14. The plurality of fan blades 20 extend outwardly from the central fan wheel 18 in the radial direction away from the axis 14.

The fan rotor 10 is illustratively mounted to a turbine engine core 20 to be rotated by the engine core 20 as suggested, for example, in FIG. 1. Engine core 20 includes a compressor 22, a combustor 24, and a turbine 26 all mounted to case 16. Compressor 22 is configured to compress and deliver air to the combustor 24. Combustor 24 is configured to mix fuel with the compressed air received from compressor 22 and to ignite the fuel. The hot high pressure products of the combustion reaction in combustor 24 are directed into turbine 26 and turbine 26 extracts work to drive compressor 22 and the fan rotor 10.

Figure 2:
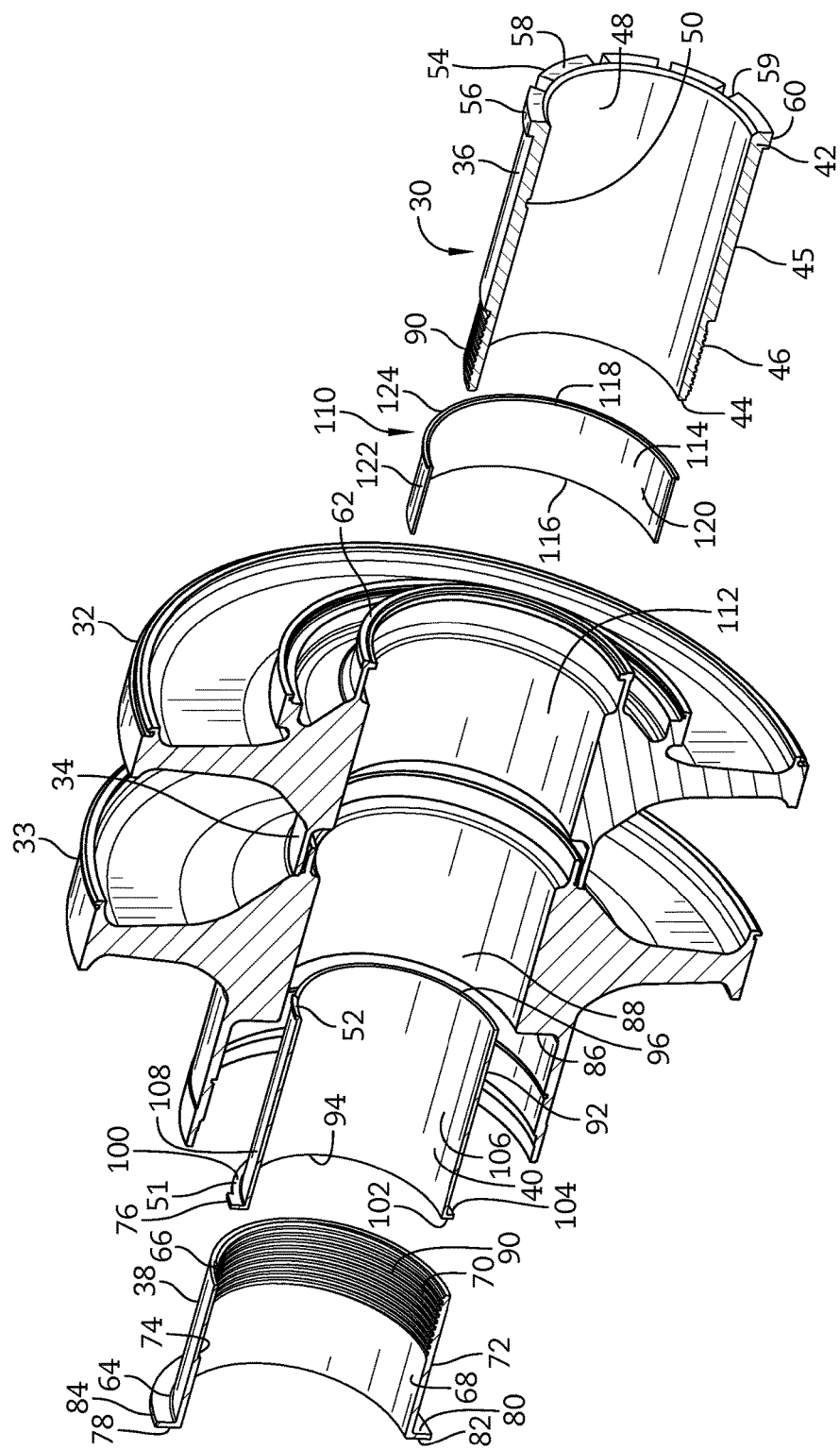
FIG. 2 is an exploded sectional view of the clamping arrangement showing a clamp cylinder, a clamp sleeve, a tube lock and an anti-score ring.

A rotor clamp assembly 30 is adapted to secure a pair of turbine discs 32, 33 having a coupling 34, in the form of a Curvic coupling, for example, or other coupling device to form a positive clamp loop across the disc bores, as shown, for example, in FIG. 2. While rotor clamp assembly 30 is shown in use with a low pressure application in the illustrations, clamp assembly 30 can also be used in high pressure and medium pressure applications. Clamp assembly 30 includes an annular clamp cylinder 36 that is adapted to be secured axially to a clamp sleeve 38. Clamp cylinder 36 and clamp sleeve 38 cooperate to exert an axial clamping force on turbine discs 32, 33. The position of clamp sleeve 38 with respect to clamp cylinder 36 is maintained by use of lock tube 40. Lock tube 40 prevents unwanted axial movement by locking the position of clamp sleeve 38 with respect to clamp cylinder 36. Lock tube 40 prevents unwanted rotational or circumferential movement between clamp sleeve 38 and clamp cylinder 36, which indirectly prevents axial movement of the clamp assembly 30.

Figure 3:
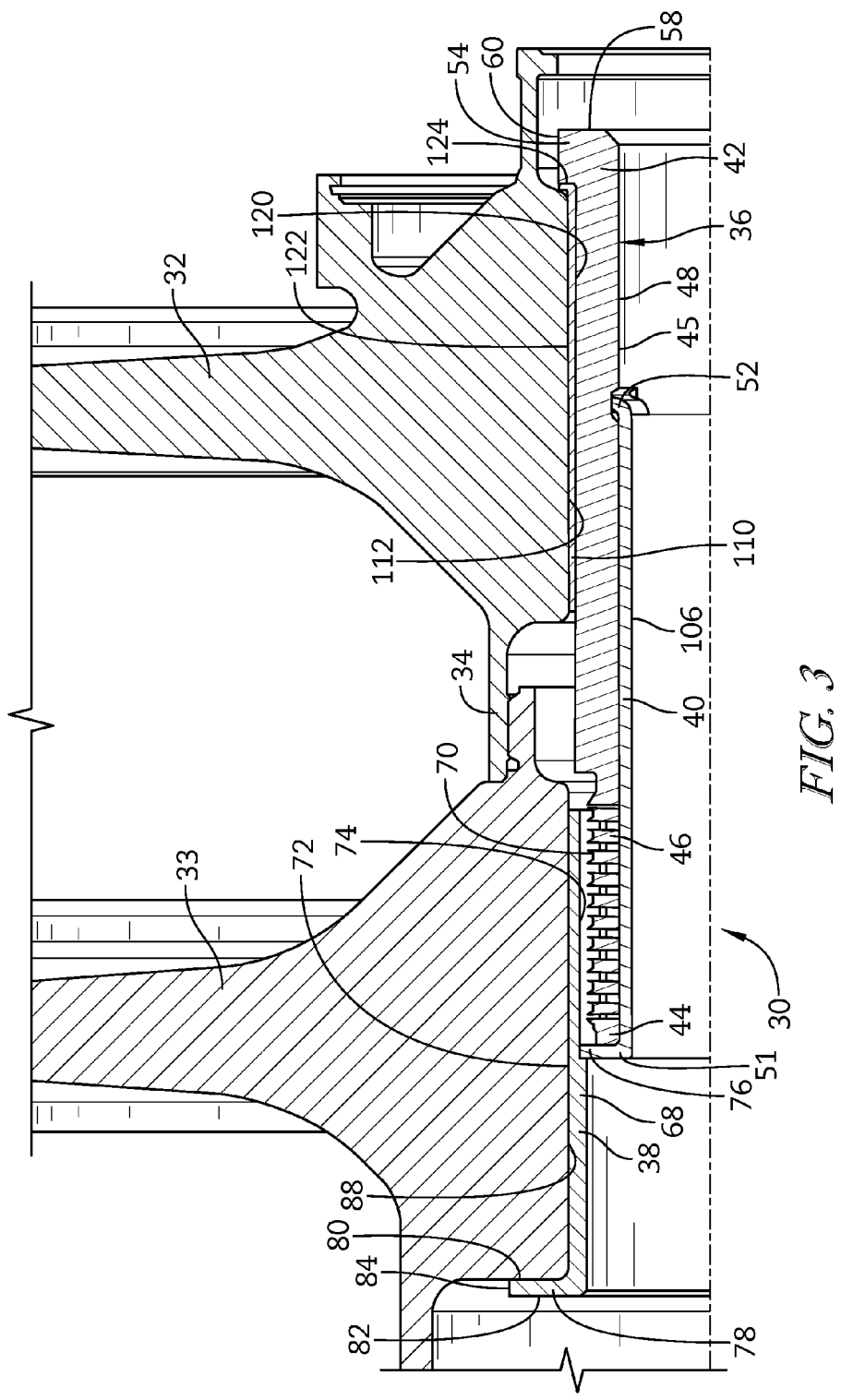
FIG. 3 is a sectional view of the clamping arrangement securing the two turbine discs.
Figure 4:
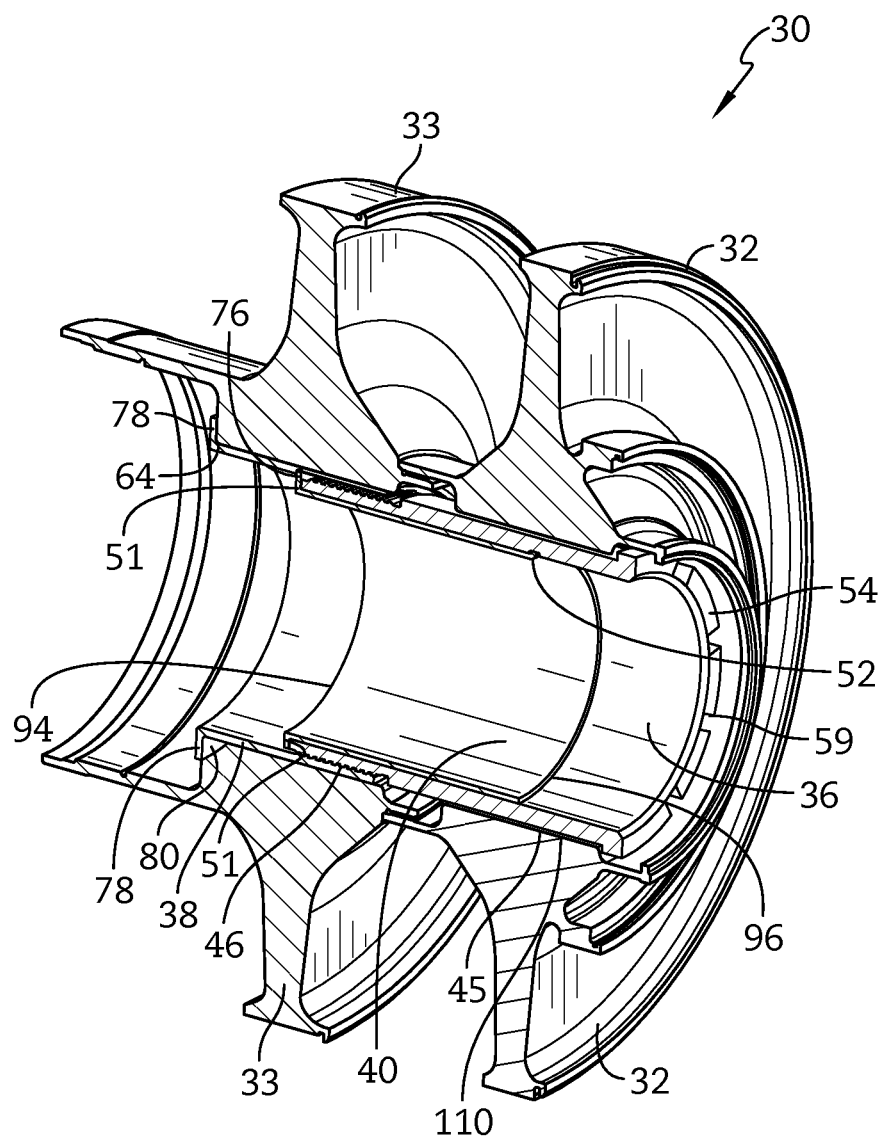
FIG. 4 is a sectional view in perspective showing a clamping arrangement securing two turbine discs that are connected using an interlocking coupling.

Clamp cylinder 36 is a tubular member that includes first end 42 and a spaced apart second end 44, as shown in FIGS. 2 and 3. Clamp cylinder 36 includes a cylindrical wall section 45 and a threaded section 46 that is adjacent cylindrical wall section 45. Clamp cylinder 36 includes a continuous inner surface 48 that forms the interior surface for both cylindrical wall section 45 and threaded section 46.

Inner surface 48 is formed to include a notch 50 that is adapted to accept lock tab 52 of lock tube 40. Clamp cylinder 36 is preferably made from stainless IN718 (Inconel alloy 718) or similar alloy. IN718 is a nickel-base super alloy that maintains strength to approximately 1400° F. (760° C.) and oxidation resistance to approximately 1800° F. (982° C.).

Clamp cylinder 36 also includes an annular flange 54 that is located at first end 42 of clamp cylinder 36. Annular flange 54 includes an inner face 56, a spaced apart outer face 58, and an outer surface 60 positioned between the inner and outer faces 56, 58. Outer face 58 of annular flange is formed to include torque notches or grooves 59. Torque notches 59 are adapted to engage with an installation tool that rotates clamp cylinder 36 with respect to clamp sleeve 38. Inner face 56 is positioned adjacent an outer surface 60 of cylindrical wall section 45. Inner face 56 of annular flange 54 is adapted to engage annular lip 62 of turbine disc 32 to apply an axial force to turbine disc 32 through coupling of clamp cylinder 36 to clamp sleeve 38.

Clamp sleeve 38 is adapted to be threadably coupled to clamp cylinder 36 to apply an axial load to Curvic couplings 32, 33. Clamp sleeve 38 is a tubular member that includes first end 64 and a spaced apart second end 66. Clamp sleeve 38 includes a cylindrical wall section 68 and a threaded section 70 that is adjacent cylindrical wall section 68.

Clamp sleeve 38 includes a continuous outer surface 72 that forms the exterior surface for both cylindrical wall section 68 and threaded section 70. Cylindrical wall section 68 and threaded section 70 are formed to include an axial slot 74 that is adapted to accept lock tab 76 of lock tube 40. Axial slot 74 is preferably milled into cylindrical wall section 68 and threaded section 70. Clamp sleeve 38 is preferably made from stainless Ni-625 or similar alloy. Ni-625 is a nickel-base superalloy that has excellent strength and superior oxidation resistance.

Clamp sleeve 38 also includes an annular flange 78 that is located at first end 64 of clamp sleeve 38. Annular flange 78 includes an inner face 80, a spaced apart outer face 82, and an outer surface 84 positioned between the inner and outer faces 80, 82. Inner face 80 is positioned adjacent outer surface 72 of cylindrical wall section 68. Inner face 80 of annular flange 78 is adapted to engage edge 86 of turbine disc 33 to apply an axial force to turbine disc 33 through coupling of clamp cylinder 36 to clamp sleeve 38.

Clamp sleeve 38 is adapted to be secured to turbine disc 33 by press fitting clamp sleeve 38 within turbine disc 33. In press fitting clamp sleeve 38, outer surface 72 of clamp sleeve 38 engages with inner bore surface 88 of turbine disc 33. Clamp sleeve 38 is inserted so that inner face 80 of annular flange 78 engages with edge 86 of turbine disc 33. Clamp sleeve 38 assembles to the first stage turbine disc 33. Clamp sleeve 38 is designed in a material that has a higher thermal expansion coefficient than the first stage turbine disc 33 allowing for differential heating and cooling to ease assembly and avoid damage to turbine disc 33. This arrangement forms an inseparable assembly.

Threaded section 46 and threaded section 70 include buttress threads 90, also known as the breech-lock thread forms, as shown in FIG. 2. Buttress thread form is designed to handle extremely high axial thrust in one direction. The load-bearing thread face is perpendicular to the screw axis or at a slight slant (usually no greater than 7° and the other face is slanted at 45°. Loose fit buttress threads formed on clamp cylinder 36 and clamp sleeve 38 pull first and second couplings 34 together and forms a positive clamp loop across the disc bores 88, 112 of first and second turbine discs 32, 33.

The resulting thread form has the same low friction properties as a square thread form but at about twice the shear strength due to the long thread base. The use of buttress threads on clamp sleeve 38 and clamp cylinder 36 removes the buttress threads from the critical rotating components, namely the turbine discs 32, 33 and greatly improves the damage tolerance capability of the turbine discs through the use of anti-score plates and inseparable assembly of clamp sleeve 38 and turbine discs 32, 33.

Lock tube 40 is adapted to prevent unwanted rotational movement between clamp sleeve 38 and clamp cylinder 36 caused by vibration, as shown in FIGS. 2 and 3. Lock tube 40 is also adapted to be positioned between clamp cylinder 36 and clamp sleeve 38. Lock tube 40 is a metallic member that includes a cylindrical side wall 92 that has a first end 94 and a spaced apart second end 96.

Second end 96 of lock tube 40 includes lock tab 52 that is adapted to engage notch 50 of inner surface 48 of clamp cylinder 36. Lock tab 52 is flexible and is biased outwardly so that lock tab 52 snaps into notch 50 of clamp cylinder 36. The interaction of lock tab 52 with notch 50 prevents unwanted rotation of clamp cylinder 36.

Lock tube 40 also includes an annular collar 51 positioned at first end 94. Annular collar 51 includes a first face 100, spaced apart second face 102 and a side edge 104 interconnecting first and second faces 100, 102. Side edge 104 includes outwardly extending lock tab 76 that is adapted to engage with axial slot 74 formed in clamp sleeve 38.

Cylindrical side wall 92 of lock tube 40 includes an inside surface 106 and an outside surface 108. Outside surface 108 of cylindrical sidewall 92 is adapted to engage inner surface 48 of clamp cylinder 36. Lock tabs 52 and 76 secure the position of clamp cylinder 36 with respect to clamp sleeve 38 to prevent unwanted rotation of the two components. Such an arrangement maintains the axial load applied to turbine discs 32, 33.

Clamp assembly 30 includes an anti-score ring 110 that is positioned between bore 112 of turbine disc 32 and clamp cylinder 36. Anti-score ring 110 is designed to permit rotation of clamp cylinder 36 to permit threaded engagement with clamp sleeve 38 without causing damage, in the form of scoring, to turbine disc 32 bore. Anti-score ring 110 is preferably made from 300 series stainless steel or material having similar properties.

Anti-score ring 110 includes an annular sidewall 114 having a first end 116 and a spaced apart second end 118. Annular sidewall 114 also includes an inner surface 120 and an outer surface 122. Second end 118 of annular sidewall 114 includes an annular lip 124. Annular lip 124 of anti-score ring 110 is adapted to engage annular lip 62 of turbine disc 32 to prevent unwanted wear. Outer surface 122 is adapted to engage bore 112 of turbine disc 32 to prevent unwanted wear to bore 112.

Clamp cylinder 36 permits significant improvements in assembly/disassembly time over conventional interstage bolted joints, which require specialized tooling and limit the design of interstage static structures. Clamp cylinder 36 removes buttress threads from the critical rotating components, such as turbine discs 32, 33 and greatly improves the damage tolerance capability of the turbine discs 32, 33 through the use of anti-score plate 110 and the coupling of clamp sleeve 38 to turbine disc 33. The present arrangement improves Curvic coupling stability by moving the radial location of the clamp loop in line with the Curvic coupling. This improves Curvic wear and dynamics of the rotors.

The present arrangement also permits the use of a rim spacer or mini-disk, which improves the interstage sealing and clearance control. This leads to an improvement in the amount of ingress flow allowed into the turbine interstage cavity. The present arrangement enables the use of full-ring (360 degree) interstage static seals that interface with disk rim-mounted seals. This greatly reduces assembly complexity and improves sealing efficiency and clearance control.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and
an anti-score ring positioned between the bore of the first turbine disc and the cylindrical wall section of the clamp cylinder, the anti-score ring including an annular sidewall having an outer surface that is sized to engage the bore of the first turbine disc to prevent unwanted wear to the bore;
wherein when the clamp cylinder is threaded and tightened with respect to the clamp sleeve an axial force is applied to the first and second turbine discs.

2. The rotor clamp of claim 1, wherein the threaded section of the clamp cylinder includes a series of buttress threads.

3. The rotor clamp of claim 2, wherein the threaded section of the clamp sleeve includes a series of buttress threads.

4. The rotor clamp of claim 1, wherein the coefficient of expansion of the clamp sleeve is different than the coefficient of expansion of the second turbine disc.

5. The rotor clamp of claim 1, wherein the anti-score ring includes an annular lip that extends radially outward from the annular sidewall of the anti-score ring that is adapted to engage an axially-facing surface of the second turbine disk to prevent unwanted wear.

6. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder;
an anti-score ring positioned between the bore of the first turbine disc and the cylindrical wall section of the clamp cylinder; and
a lock tube positioned within the clamp cylinder and having a first lock tab that engages a notch formed in the cylindrical wall section of the clamp cylinder,
wherein when the clamp cylinder is threaded and tightened with respect to the clamp sleeve an axial force is applied to the first and second turbine discs.

7. The rotor clamp of claim 6, wherein the lock tube includes a second lock tab that is adapted to engage a slot formed in the cylindrical wall section of the clamp sleeve wherein the lock tube prevents unwanted rotation of the clamp cylinder with respect to the clamp sleeve.

8. The rotor clamp of claim 7, wherein the slot is elongated and extends through at least a portion of the threaded section of the clamp sleeve.

9. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and
an anti-score ring positioned between the bore of the first turbine disc and the cylindrical wall section of the clamp cylinder;
wherein when the clamp cylinder is threaded and tightened with respect to the clamp sleeve an axial force is applied to the first and second turbine discs, and
wherein the clamp sleeve is press fit into the bore of the second turbine disc.

10. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;

a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and an anti-score ring positioned between the bore of the first turbine disc and the cylindrical wall section of the clamp cylinder;

wherein when the clamp cylinder is threaded and tightened with respect to the clamp sleeve an axial force is applied to the first and second turbine discs, and wherein the clamp sleeve includes an annular flange at a first end the annular flange having an inner face that is adapted to engage the second turbine disc when the clamp sleeve and clamp cylinder are secured together.

11. The rotor clamp of claim 10, wherein the clamp cylinder includes an annular flange having an inner face that is adapted to engage the first turbine disc when the clamp sleeve and clamp cylinder are secured together.

12. The rotor clamp of claim 11, wherein the annular flange of the clamp cylinder is formed to include a series of grooves on an outer face to permit the clamp cylinder to be rotated with respect to the clamp sleeve.

13. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and
a lock tube including a cylindrical sidewall positioned within the clamp cylinder and a first lock tab extending radially from the cylindrical sidewall to engage a notch formed in the cylindrical wall section of the clamp cylinder such that the lock tube is adapted to prevent unwanted rotation of the clamp cylinder with respect to the clamp sleeve;
wherein when the clamp cylinder is threaded and tightened with respect to the clamp sleeve an axial force is applied to the first and second turbine discs;
wherein the lock tube includes a second lock tab that is adapted to engage a slot formed in the cylindrical wall section of the clamp sleeve wherein the lock tube prevents unwanted rotation of the clamp cylinder with respect to the clamp sleeve; and
wherein the slot is elongated and extends through at least a portion of the threaded section of the clamp sleeve.

14. The rotor clamp of claim 13, wherein the coefficient of expansion of the clamp sleeve is different than the coefficient of expansion of the second turbine disc.

15. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and
a lock tube positioned within the clamp cylinder and having a first lock tab that engages a notch formed in the cylindrical wall section of the clamp cylinder the lock tube adapted to prevent unwanted rotation of the clamp cylinder with respect to the clamp sleeve;
wherein when the clamp cylinder is threaded and tightened with respect to the clamp sleeve an axial force is applied to the first and second turbine discs, and wherein the clamp sleeve is press fit into the bore of the second turbine disc.

16. A low diameter turbine rotor clamp for securing turbine discs together comprising:
a clamp cylinder having a cylindrical wall section and a threaded section that is adjacent the cylindrical wall section, the clamp cylinder adapted to be positioned within a bore of a first turbine disc;
a clamp sleeve having a cylindrical wall section and a threaded section that is adjacent the cylindrical wall section, the clamp sleeve adapted to be positioned within a bore of a second turbine disc, the threaded section of the clamp sleeve is adapted to threadably engage the threaded section of the clamp cylinder; and
a lock tube positioned within the clamp cylinder and having a first lock tab that engages a notch formed in the cylindrical wall section of the clamp cylinder the lock tube adapted to prevent unwanted rotation of the clamp cylinder with respect to the clamp sleeve;
wherein when the clamp cylinder is threaded and tightened with respect to the clamp sleeve an axial force is applied to the first and second turbine discs, and wherein the clamp sleeve includes an annular flange at a first end the annular flange having an inner face that is adapted to engage the second turbine disc when the clamp sleeve and clamp cylinder are secured together.

17. The rotor clamp of claim 16, wherein the clamp cylinder includes an annular flange having an inner face that is adapted to engage the first turbine disc when the clamp sleeve and clamp cylinder are secured together.

18. The rotor clamp of claim 17, wherein the annular flange of the clamp cylinder is formed to include a series of grooves on an outer face to permit the clamp cylinder to be rotated with respect to the clamp sleeve.

19. A turbine rotor clamp for securing turbine discs together comprising:
a clamp cylinder having a cylindrical wall section and formed to include a series of buttress threads;
a clamp sleeve adapted to be secured to the clamp cylinder, the clamp sleeve having a cylindrical wall section formed to include a series of buttress threads that are adapted to engage the buttress threads of the clamp cylinder;
an anti-score ring positioned around the cylindrical wall section of the clamp cylinder;
a lock tube adapted to be positioned within the clamp cylinder, the lock tube having first and second lock tabs adapted to engage the clamp cylinder and the clamp sleeve to prevent unwanted movement of the clamp cylinder with respect to the clamp sleeve; and
wherein when the clamp cylinder is threaded and tightened with respect to the clamp sleeve an axial clamping force is applied to the first and second turbine discs.

* * * * *